(12) United States Patent
Liu

(10) Patent No.: US 9,428,824 B2
(45) Date of Patent: Aug. 30, 2016

(54) METAL-COATED STEEL STRIP

(71) Applicant: BLUESCOPE STEEL LIMITED, Melbourne, Victoria (AU)

(72) Inventor: Qiyang Liu, New South Wales (AU)

(73) Assignee: Bluescope Steel Limited, Melbourne (AU)

( * ) Notice: Subject to any disclaimer, the term of this patent is extended or adjusted under 35 U.S.C. 154(b) by 0 days.

(21) Appl. No.: 14/232,584

(22) PCT Filed: Jul. 31, 2013

(86) PCT No.: PCT/AU2013/000843
§ 371 (c)(1),
(2) Date: Jan. 13, 2014

(87) PCT Pub. No.: WO2014/019020
PCT Pub. Date: Feb. 6, 2014

(65) Prior Publication Data
US 2015/0132603 A1    May 14, 2015

(30) Foreign Application Priority Data

Aug. 1, 2012 (AU) ................................ 2012903281

(51) Int. Cl.
*B32B 15/01* (2006.01)
*C23C 2/40* (2006.01)
(Continued)

(52) U.S. Cl.
CPC ............... *C23C 2/06* (2013.01); *B32B 15/012* (2013.01); *C22C 21/02* (2013.01); *C22C 21/10* (2013.01);
(Continued)

(58) Field of Classification Search
CPC ......... C23C 2/06; C23C 2/12; C23C 28/021; C23C 2/40; C23C 2/04; C23C 2/00; C23C 28/02; C23C 30/00; C23C 30/005; C23C 38/023; C23C 2/20; C23C 2/28; C23C 28/00; C23C 2/02; B32B 15/012; B32B 15/04; B32B 15/18; B32B 15/20; Y10T 428/1275; Y10T 428/12757; Y10T 428/12972; Y10T 428/12979; Y10T 428/24967; Y10T 428/24975; Y10T 428/265; C22C 21/00; C22C 30/00; C22C 30/06; C22C 38/06; C22C 21/10
See application file for complete search history.

(56) References Cited

U.S. PATENT DOCUMENTS 4,401,727 A     8/1983   Berke et al.
6,635,359 B1 * 10/2003   Kurosaki .................. C23C 2/06
                                                    428/648
(Continued)

FOREIGN PATENT DOCUMENTS

EP     1225246      7/2002
EP     2388353     11/2011
(Continued)

OTHER PUBLICATIONS

Machine Translation, Yamanaka et al., JP 2002-060978, Feb. 2002.*
(Continued)

*Primary Examiner* — Michael E La Villa
(74) *Attorney, Agent, or Firm* — Michael Best & Friedrich LLP

(57) ABSTRACT

A metallic coated steel strip includes a steel strip and a metallic coating on at least one side of the strip. The metallic coating includes an Al—Zn—Mg—Si overlay alloy layer and an intermediate alloy layer between the steel strip and the overlay alloy layer. The intermediate alloy layer has a composition of, by weight, 4.0-12.0% Zn, 6.0-17.0% Si, 20.0-40.0% Fe, 0.02-0.50% Mg, and balance Al and unavoidable impurities.

29 Claims, 9 Drawing Sheets

MAS vs AZ

(51) Int. Cl.
  *C23C 2/12* (2006.01)
  *C23C 2/06* (2006.01)
  *C23C 28/02* (2006.01)
  *C22C 21/02* (2006.01)
  *C22C 21/10* (2006.01)
  *C23C 2/02* (2006.01)
  *C23C 2/20* (2006.01)
  *C23C 2/28* (2006.01)
  *C23C 28/00* (2006.01)

(52) U.S. Cl.
  CPC . *C23C 2/02* (2013.01); *C23C 2/12* (2013.01); *C23C 2/20* (2013.01); *C23C 2/28* (2013.01); *C23C 2/40* (2013.01); *C23C 28/00* (2013.01); *C23C 28/021* (2013.01); *C23C 28/023* (2013.01); *Y10T 428/1275* (2015.01); *Y10T 428/12757* (2015.01); *Y10T 428/12972* (2015.01); *Y10T 428/12979* (2015.01); *Y10T 428/24967* (2015.01); *Y10T 428/24975* (2015.01); *Y10T 428/265* (2015.01)

(56) References Cited

U.S. PATENT DOCUMENTS

2009/0011277 A1    1/2009  Liu
2011/0052936 A1    3/2011  Liu

FOREIGN PATENT DOCUMENTS

| EP | 455509 | | 5/2012 |
| JP | 2002-060978 | * | 2/2002 |
| WO | WO 2011/082450 | * | 7/2011 |
| WO | 2012070694 | | 5/2012 |

OTHER PUBLICATIONS

International Search Report from the Australian Patent Office for Application No. PCT/AU2013/000843 dated Nov. 5, 2013 (3 pages).

Extended European Search Report for Application No. 13774355.5 dated Jan. 21, 2016 (9 pages).

* cited by examiner

HDPS MAZ Vs MCL MAZ

| Target Coating | Alloy Layer Composition by ICP (m/m%) | | | | | | Double-sided Alloy Layer Mass (g/m²) |
|---|---|---|---|---|---|---|---|
| | Al | Zn | Mg | Si | Fe | Unavoidable Impurities | |
| MAZ 600°C | 50.1 | 8.2 | 0.09 | 9.0 | 32.1 | balance | 7 |
| MAZ 620°C | 54.2 | 6.0 | 0.10 | 5.4 | 33.8 | balance | 14 |

Figure 6. Result of Q-Fog mass loss test showing composition of intermediate alloy layer outside the invention range leads to greater corrosion loss, or a decrease in corrosion resistance of the MAZ coating.

Correlation between alloy layer mass and pot Mg or pot Si levels

Effect of coating composition and immersion time on the alloy layer formation

Effect of coating mass (overlay thickness) on alloy layer thickness

METAL-COATED STEEL STRIP

BACKGROUND AND SUMMARY OF THE INVENTION

The present invention relates to the production of metal strip, typically steel strip, which has a corrosion-resistant metallic coating that contains aluminium-zinc-silicon-magnesium as the main elements, although not necessarily the only elements, in the coating alloy, and is hereinafter referred to as an "Al—Zn—Si—Mg alloy" on this basis.

In particular, the present invention relates to a hot-dip coating method of forming a metallic coating on a strip that includes dipping uncoated strip into a bath of molten Al—Zn—Si—Mg alloy and forming a coating of the alloy on the strip.

Typically, the composition of the molten Al—Zn—Si—Mg alloy comprises the following ranges in % by weight of the elements Al, Zn, Si, and Mg:

| | |
|---|---|
| Zn: | 30 to 60% |
| Si: | 0.3 to 3% |
| Mg: | 0.3 to 10% |
| Balance | Al and unavoidable impurities. |

More typically, the composition of the molten Al—Zn—Si—Mg alloy comprises the following ranges in % by weight of the elements Al, Zn, Si, and Mg:

| | |
|---|---|
| Zn: | 35 to 50% |
| Si: | 1.2 to 2.5% |
| Mg | 1.0 to 3.0% |
| Balance | Al and unavoidable impurities. |

The composition of the molten Al—Zn—Si—Mg alloy may contain other elements that are present in the molten alloy as deliberate alloying additions or as unavoidable impurities. Hence, the phrase "Al—Zn—Si—Mg alloy" is understood herein to cover alloys that contain such other elements as deliberate alloying additions or as unavoidable impurities. The other elements may include by way of example any one or more of Fe, Sr, Cr, and V.

Depending on the end-use application, the metallic coated strip may be painted, for example with a polymeric paint, on one or both surfaces of the strip. In this regard, the metallic coated strip may be sold as an end product itself or may have a paint coating applied to one or both surfaces and be sold as a painted end product.

The present invention relates particularly but not exclusively to steel strip that has a metallic coating formed from the above-described molten Al—Zn—Si—Mg alloy composition and is also optionally coated with a paint and thereafter is cold formed (e.g. by roll forming) into an end-use product, such as building products (e.g. profiled wall and roofing sheets).

One corrosion resistant metal coating bath composition that is used widely in Australia and elsewhere for building products, particularly profiled wall and roofing sheets, is a 55% Al—Zn alloy coating composition that also contains Si. The profiled sheets are usually manufactured by cold forming painted, metal alloy coated strip. Typically, the profiled sheets are manufactured by roll-forming the painted strip.

The addition of Mg to this known composition of 55% Al—Zn—Si alloy coating composition has been proposed in the patent literature for a number of years, see for example U.S. Pat. No. 6,635,359 in the name of Nippon Steel Corporation, but Al—Zn—Si—Mg coatings on steel strip are not commercially available in Australia.

It has been established that when Mg is included in a 55% Al—Zn—Si alloy coating composition, Mg brings about certain beneficial effects on product performance, such as improved cut-edge protection.

The applicant has carried out extensive research and development work in relation to Al—Zn—Si—Mg alloy coatings on strip such as steel strip. The present invention is the result of part of this research and development work.

The above discussion is not to be taken as an admission of the common general knowledge in Australia and elsewhere.

The present invention is based on a finding of the applicant during the course of the research and development work that forming an Al—Zn—Si—Mg alloy coating on a steel strip so that there is an intermediate alloy layer having a selected composition and preferably a selected crystal structure between an Al—Zn—Si—Mg alloy coating overlay layer and the steel strip can improve the corrosion performance of the coated strip. The research and development work also found that the selected composition and preferred crystal structure of the intermediate alloy layer that can improve corrosion performance of the coated strip is not an inevitable outcome of the selection of the Al—Zn—Si—Mg alloy composition for use in a hot dip coating bath, and a number of factors such as but not limited to molten Al—Zn—Si—Mg alloy bath composition and hot dip process conditions, typically strip immersion time and coating pot temperature, are relevant factors to forming the intermediate alloy layer having the required composition and the preferred crystal structure.

According to the present invention there is provided a metallic coated steel strip that includes a steel strip and a metallic coating on at least one side of the strip, with the metallic coating including an Al—Zn—Si—Mg overlay alloy layer and an intermediate alloy layer between the steel strip and the overlay alloy layer, and wherein the intermediate alloy layer has a composition of, by weight, 4.0-12.0% Zn, 6.0-17.0% Si, 20.0-40.0% Fe, 0.02-0.50% Mg, and balance Al and unavoidable impurities.

The intermediate alloy layer may be formed as an intermetallic phase of elements in the compositions of the molten Al—Zn—Mg—Si alloy and the steel strip.

Alternatively, the intermediate alloy layer and the Al—Zn—Mg—Si overlay alloy layer may be formed as separate layers.

The intermediate alloy layer may include, by weight, 5.0-10.0% Zn, 7.0-14.0% Si (typically 6.5-14.0% Si), 25.0-37.0% Fe, 0.03-0.25% Mg, balance Al and unavoidable impurities.

The intermediate alloy layer may include, by weight, 6.0-9.0% Zn, 8.0-12.0% Si, 28.0-35.0% Fe, 0.05-0.15% Mg, balance Al and unavoidable impurities.

The intermediate alloy layer may include, by weight, 0.01-0.2% Ca.

The intermediate alloy layer may include, by weight, 0.1-3.0% Cr.

The intermediate alloy layer may include, by weight, 0.1-13.0% Mn.

The intermediate alloy layer may include, by weight, 0.1-2.0% V.

The intermediate alloy layer may have a thickness of 0.1-5.0 μm as measured on a cross-section through the thickness of the coating.

The intermediate alloy layer may have a thickness of 0.3-2.0 μm as measured on a cross-section through the thickness of the coating.

The intermediate alloy layer may have a thickness of 0.5-1.0 μm as measured on a cross-section through the thickness of the coating.

The intermediate alloy layer may include substantially columnar crystals measuring 50-1000 nm in a short diameter as measured on a cross section through the thickness of the coating.

The intermediate alloy layer may include substantially equiaxial crystals measuring 50-4000 nm in a long diameter as measured on a cross section through the thickness of the coating.

The intermediate alloy layer may include a mixture of columnar crystals and equiaxial crystals.

The intermediate alloy layer may include body centred cubic crystals.

The Al, Zn, Si and Fe concentrations of the intermediate alloy layer may satisfy the formula $Fe_{10}Al_{32}Si_5Zn_3$.

The Al, Zn, Si and Fe concentrations of the intermediate alloy layer may satisfy the formula $Fe_{10}Al_{34}Si_4Zn_2$.

The strip may be a passivated strip, for example using a Cr-containing or Cr-free passivation system.

The strip may include a resin coating on an exposed surface of the Al—Zn—Mg—Si alloy coating.

A molten Al—Zn—Si—Mg alloy for forming the metallic coating may include more than 0.3% by weight Mg.

The molten Al—Zn—Si—Mg alloy for forming the metallic coating may include more than 1.0% by weight Mg.

The molten Al—Zn—Si—Mg alloy for forming the metallic coating may include more than 1.3% by weight Mg.

The molten Al—Zn—Si—Mg alloy for forming the metallic coating may include more than 1.5% by weight Mg.

The molten Al—Zn—Si—Mg alloy for forming the metallic coating may include less than 3% by weight Mg.

The molten Al—Zn—Si—Mg alloy for forming the metallic coating may include less than 2.5% by weight Mg.

The molten Al—Zn—Si—Mg alloy for forming the metallic coating may include more than 1.2% by weight Si.

The molten Al—Zn—Si—Mg alloy for forming the metallic coating may include less than 2.5% by weight Si.

The molten Al—Zn—Si—Mg alloy for forming the metallic coating may include the following ranges in % by weight of the elements Al, Zn, Si, and Mg:

| | |
|---|---|
| Zn: | 30 to 60% |
| Si: | 0.3 to 3% |
| Mg: | 0.3 to 10% |
| Balance | Al and unavoidable impurities |

In particular, the molten Al—Zn—Si—Mg alloy for forming the metallic coating may include the following ranges in % by weight of the elements Al, Zn, Si, and Mg:

| | |
|---|---|
| Zn: | 35 to 50% |
| Si: | 1.2 to 2.5% |
| Mg | 1.0 to 3.0% |
| Balance | Al and unavoidable impurities. |

The steel may be a low carbon steel.

According to the present invention there is also provided a method of forming a metallic coating on a steel strip to form the above-described metallic coated steel strip, the method including dipping steel strip into a bath of a molten Al—Zn—Si—Mg alloy and forming a metallic coating of the alloy on exposed surfaces of the steel strip, and the method including controlling any one or more of the composition of the molten alloy bath, the temperature of the molten alloy bath, and the immersion time of the steel strip in the molten alloy bath to form the intermediate alloy layer between the steel strip and the Al—Zn—Mg—Si overlay alloy layer.

The molten Al—Zn—Si—Mg alloy may have the composition described above. For example, the molten Al—Zn—Si—Mg alloy may include the following ranges in % by weight of the elements Al, Zn, Si, and Mg:

| | |
|---|---|
| Zn: | 30 to 60% |
| Si: | 0.3 to 3% |
| Mg: | 0.3 to 10% |
| Balance | Al and unavoidable impurities. |

BRIEF DESCRIPTION OF THE DRAWINGS

The present invention is described further by way of example with reference to the accompanying drawings of which.

DETAILED DESCRIPTION

Figure 1:
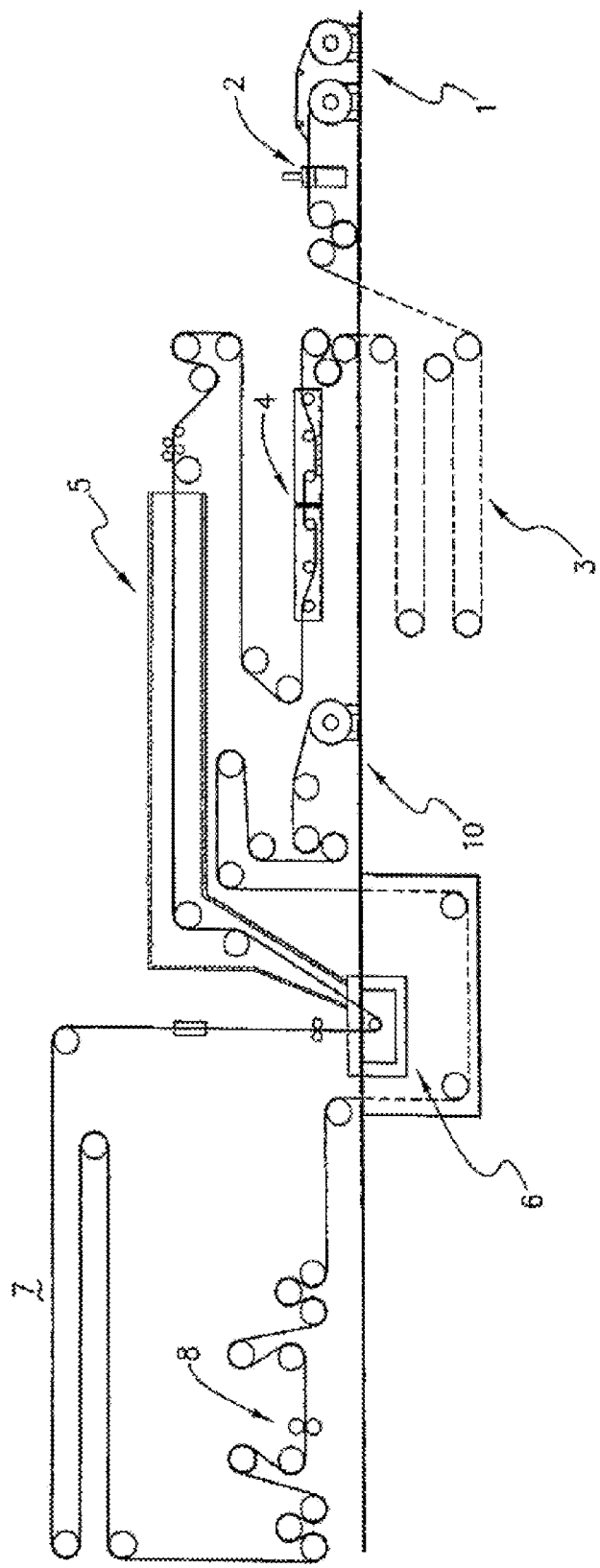
FIG. 1 is a schematic drawing of one embodiment of a continuous production line for producing steel strip coated with an Al—Zn—Si—Mg alloy in accordance with the method of the present invention.

With reference to the continuous production line for coating steel strip shown diagrammatically in FIG. 1, in use, coils of cold rolled low carbon steel strip are uncoiled at an uncoiling station 1 and successive uncoiled lengths of strip are welded end to end by a welder 2 and form a continuous length of strip.

The strip is then passed successively through an accumulator 3, a strip cleaning section 4 and a furnace assembly 5. The furnace assembly 5 includes a preheater, a preheat reducing furnace, and a reducing furnace.

The strip is heat treated in the furnace assembly 5 by control of process variables including: (i) the temperature profile in the furnaces, (ii) the reducing gas concentration in the furnaces, (iii) the gas flow rate through the furnaces, and (iv) strip residence time in the furnaces (i.e. line speed).

The process variables in the furnace assembly 5 are controlled so that there is removal of iron oxide residues from the surface of the strip and removal of residual oils and iron fines from the surface of the strip.

The heat treated strip is then passed via an outlet snout downwardly into and through a molten bath containing an Al—Zn—Si—Mg alloy held in a coating pot 6 and is coated with molten Al—Zn—Si—Mg alloy. The Al—Zn—Si—Mg alloy is maintained molten in the coating pot at a selected temperature by use of heating inductors (not shown) or other suitable heating options. Within the bath the strip passes around a sink roll (not shown) positioned in the bath and is taken upwardly out of the bath. The line speed is selected to provide a selected immersion time of strip in the coating bath. Both surfaces of the strip are coated with the molten Al—Zn—Si—Mg alloy as it passes through the bath.

After leaving the coating bath 6 the strip passes vertically through a gas wiping station (not shown) at which its coated surfaces are subjected to jets of wiping gas to control the thickness of the coating.

The coated strip is then passed through a cooling section 7 and subjected to forced cooling.

The cooled, coated strip is then passed through a rolling section 8 that conditions the surface of the coated strip.

The coated strip is thereafter coiled at a coiling station 10.

As discussed above, the applicant has conducted extensive research and development work in relation to Al—Zn—Si—Mg alloy coatings on steel strip and found that forming a metallic coating that includes an overlay alloy layer and an intermediate alloy layer having a selected composition and preferably a selected crystal structure between the overlay alloy layer and the steel strip can improve the corrosion performance of the metallic coated strip.

The research and development work included work carried out by hot dip coating steel strip samples with the following molten alloy compositions: (a) a known Al—Zn—Si alloy (hereinafter referred to as "AZ"), (b) an Al—Zn—Si—Mg alloy (hereinafter referred to as "MAZ") in accordance with the invention and (c) a MAZ alloy plus 0.1 wt. % Cr in accordance with the invention, having the following molten alloy compositions, in wt. %:

AZ: 55Al-43Zn-1.5Si-0.45Fe-incidental impurities.
MAZ: 53Al-43Zn-2Mg-1.5Si-0.45Fe-incidental impurities.
MAZ+0.1 wt. % Cr-incidental impurities.

The molten alloys were coated onto exposed surfaces of steel strip samples with a double-sided coating mass of 125 g/m² and 150 g/m². One group of samples was produced on a metal coating line ("MCL") at the Wollongong operations of the applicant and another group of samples was produced on a Hot Dip Process Simulator ("HDPS") at research facilities of the applicant in Wollongong. Experimental work was primarily conducted on the HDPS. The HDPS is a state-of-the-art unit purpose-built to the specifications of the applicant by Iwatani International Corp (Europe) GmbH.

The HDPS unit comprises a molten metal pot furnace, an infrared heating furnace, gas wiping nozzles, de-drossing mechanisms, gas mixing and dewpoint management functions, and computerized automatic control systems. The HDPS unit is capable of simulating a typical hot dip cycle on a conventional metal coating line.

Coated samples were tested for corrosion resistance (Q-Fog cyclic corrosion test performance) and were subjected to microstructural analysis using a scanning electron microscope and other analytical equipment.

Figure 2:
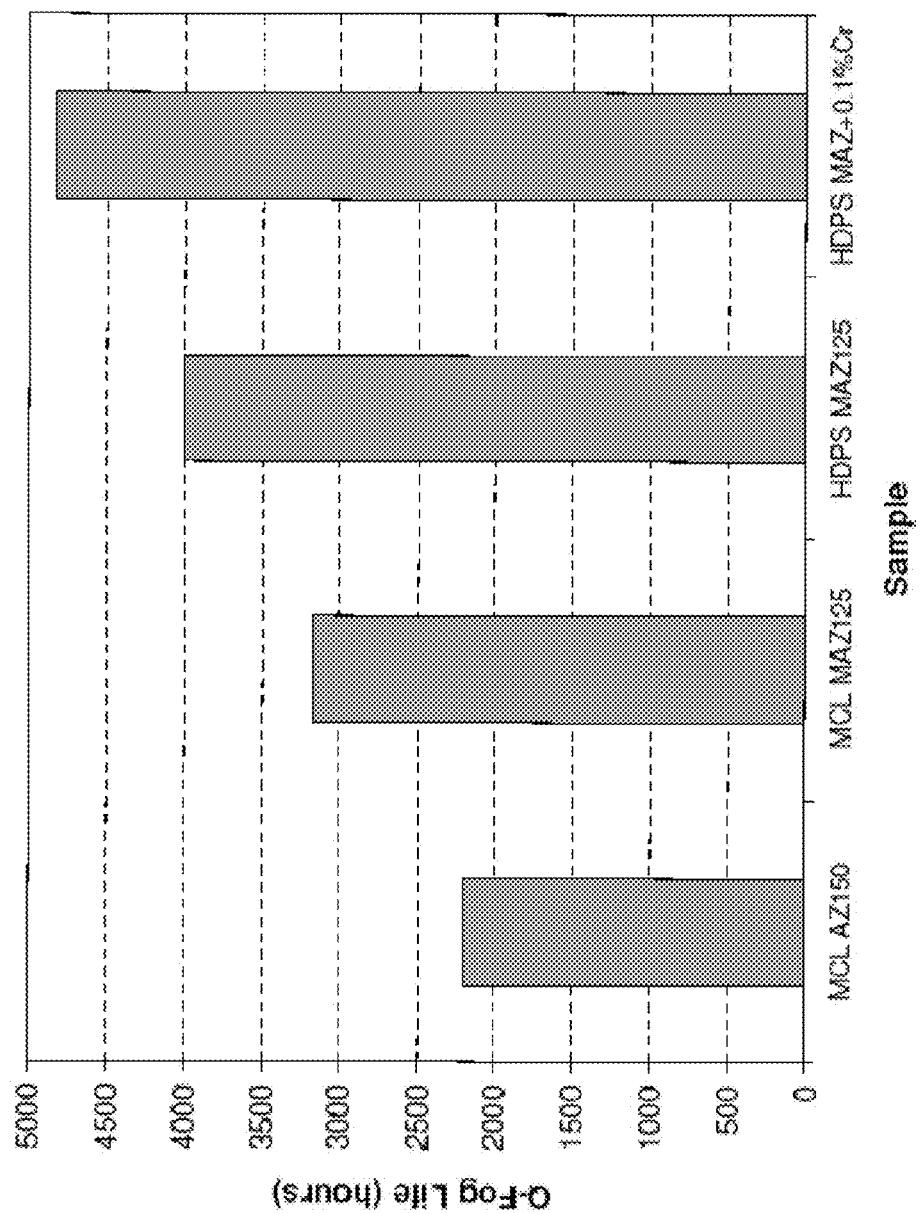
FIG. 2 is a graph of Q-Fog life (time in hours to 5% surface red rust) for samples of a known Al—Zn—Si alloy coating on steel strip and an Al—Zn—Si—Mg alloy coating on steel strip in accordance with the invention.

FIG. 2 is a graph of Q-Fog life (time in hours to 5% surface red rust) for the following samples:

MCL AZ150—AZ alloy coating with a double-sided coating mass of 150 g/m² produced on the metal coating line.

MCL MAZ125—MAZ alloy coating with a double-sided coating mass of 125 g/m² produced on the metal coating line.

HDPS MAZ125—MAZ alloy coating with a double-sided coating mass of 125 g/m² produced on the Hot Dip Process Simulator.

HDPS MAZ125+0.1% Cr-MAZ+0.1% Cr alloy coating with a double-sided coating mass of 125 g/m² produced on the Hot Dip Process Simulator.

It is evident from FIG. 2 that the MAZ alloy coating samples had significantly longer Q-Fog lives and therefore significantly better corrosion resistance than the AZ alloy coating sample, with the MAZ+0.1% Cr sample having the best performance of all of the samples.

FIG. 2 illustrates the improvement in corrosion resistance as a consequence of the addition of Mg to an AZ to form the MAZ alloy. FIG. 2 also illustrates that a small addition of 0.1% Cr to an MAZ alloy produced a further significant improvement in corrosion resistance.

Figure 3:
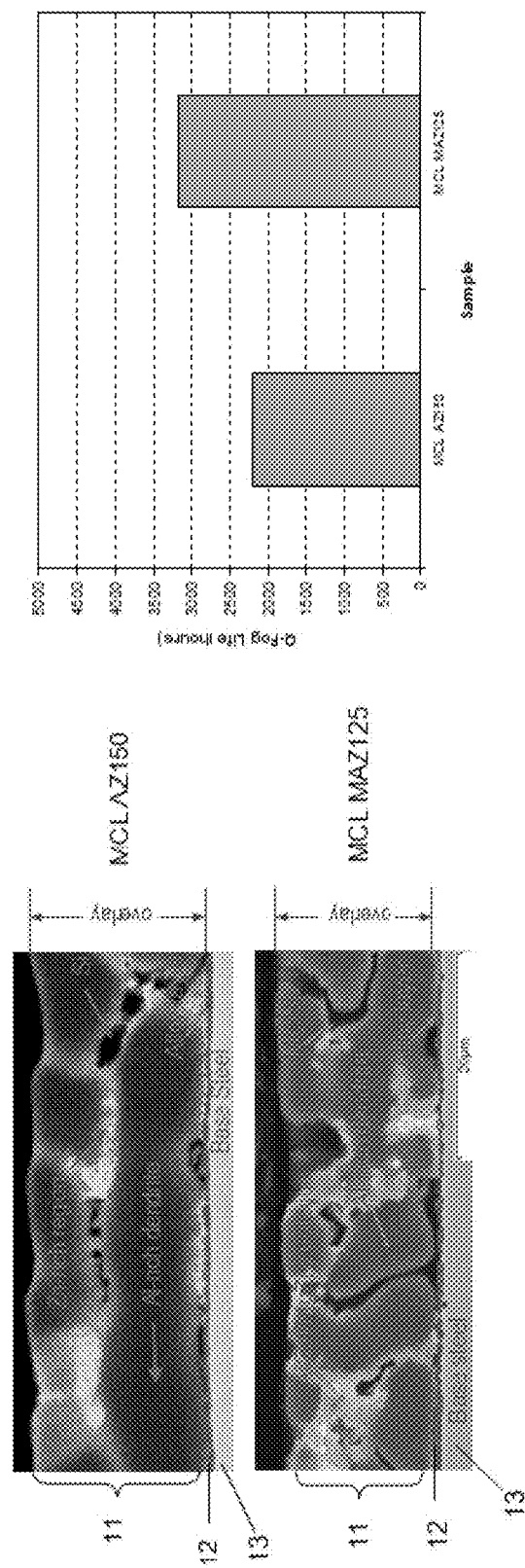
FIG. 3 presents the results of further experimental work on samples of a known Al—Zn—Si alloy coating on steel strip and an Al—Zn—Si—Mg alloy coating on steel strip in accordance with the invention.

FIG. 3 illustrates further the contribution of Mg to the improvement in corrosion resistance of MAZ alloy coatings when compared to AZ alloy coatings. The results shown in FIG. 3 are the result of experimental work on the following samples:

MCL AZ150—AZ alloy coating with a double-sided coating mass of 150 g/m² produced on the metal coating line.

MCL MAZ125—MAZ alloy coating with a double-sided coating mass of 125 g/m² produced on the metal coating line.

The left hand side of FIG. 3 is two SEM back scattered electron images of sections through the thickness of both samples. The right side of FIG. 3 is a graph of Q-Fog life (time in hours to 5% surface red rust) for the samples. Both samples were produced on the same metal coating line. The SEM images show that the samples have different coating microstructures due to the presence of Mg in the MAZ alloy. The SEM images also show that the coating of both samples includes an overlay alloy layer 11 and an intermediate alloy layer 12 (referred to as an "Alloy layer" in this and other Figures) between the steel strip 13 (referred to as "Base steel" in the Figures) and the overlay layers 11. The intermediate alloy layer is an intermetallic layer formed from elements in the molten alloy bath and the steel strip. The graph shows that the MAZ alloy coating sample had a significantly longer Q-Fog life and therefore significantly better corrosion resistance than the AZ alloy coating sample, possibly attributed to the presence of Al/Zn/MgZn$_2$ eutectic and Mg$_2$Si phases in the microstructure of the MAZ alloy coating overlay, although the intermediate layer may have also contributed to the difference in corrosion performance.

Figure 4:
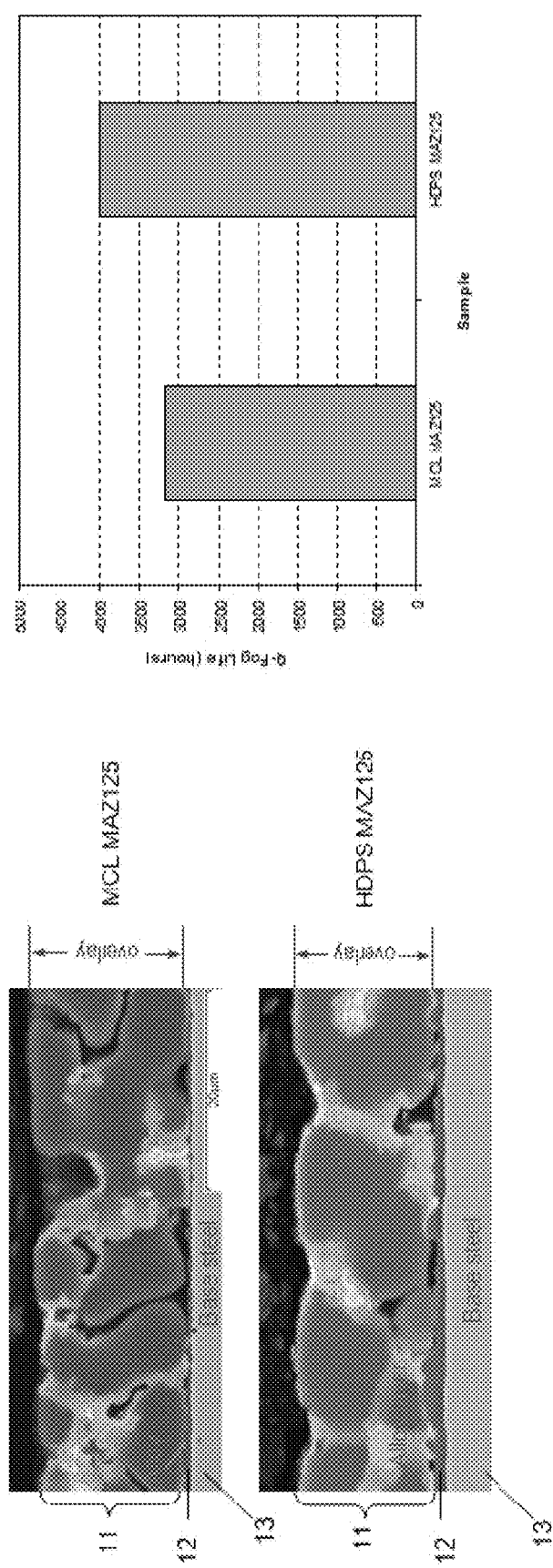
FIG. 4 presents the results of further experimental work on samples of Al—Zn—Si—Mg alloy coatings on steel strip in accordance with the invention.

FIG. 4 presents the results of further experimental work on a MAZ alloy coating that focused on the contribution of the intermediate alloy layer 12 between the steel strip 13 and the overlay alloy layers 11 of the following samples:

MCL MAZ125—MAZ alloy coating with a double-sided coating mass of 125 g/m² produced on the metal coating line.

HDPS MAZ125—MAZ alloy coating with a double-sided coating mass of 125 g/m² produced on the Hot Dip Process Simulator.

The left hand side of FIG. 4 is two SEM back scattered electron images of sections through the thickness of both samples. The right side of FIG. 4 is a graph of Q-Fog life (time in hours to 5% surface red rust) for the samples. Both samples were coated with the same molten alloy composition—MAZ alloy. One sample was produced on the metal coating line and the other sample was produced on the Hot Dip Process Simulator. Both samples had substantially the same coating thickness—approximately 18 microns. The graph shows that the HDPS MAZ125 alloy coating sample had a significantly longer Q-Fog life and therefore significantly better corrosion resistance than the MCL MAZ125 alloy coating sample. The SEM images show that the HDPS MAZ125 coating sample had a thicker intermediate alloy layer than the MCL MAZ125 coating sample due to a longer immersion time (2.5 seconds on the HDPS versus 1.0 second on the MCL). FIG. 4 is an indication that the intermediate alloy layer 12 contributed to the better corrosion resistance of the HDPS MAZ125 coating sample, i.e. a thicker intermediate alloy layer 12 produced a longer Q-Fog life.

Figure 5:
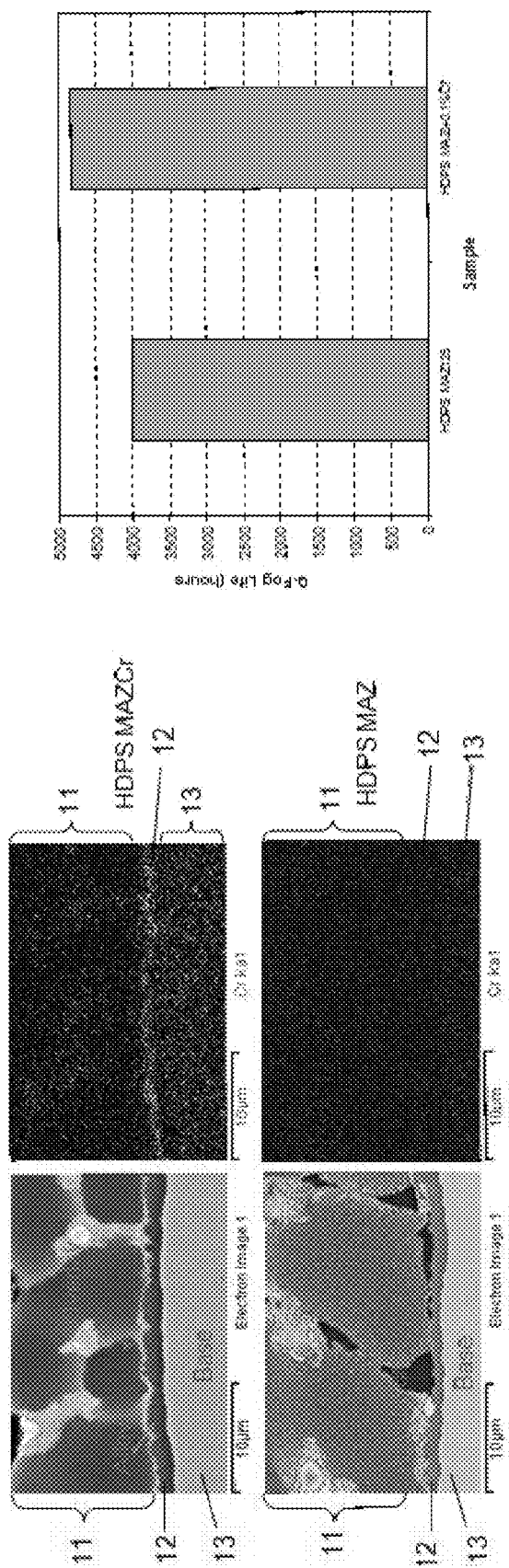
FIG. 5 presents the results of further experimental work on samples of Al—Zn—Si—Mg and Al—Zn—Si—Mg—Cr alloy coatings on steel strip in accordance with the invention.

FIG. 5 presents the results of further experimental work that focused on the contribution of Cr on the corrosion performance of the following samples:

HDPS MAZ125+0.1% Cr—MAZ+0.1% Cr alloy coating with a double-sided coating mass of 125 g/m² produced on the Hot Dip Process Simulator.

HDPS MAZ125—MAZ alloy coating with a double-sided coating mass of 125 g/m² produced on the Hot Dip Process Simulator.

The left hand side of FIG. 5 is two SEM back scattered electron images and two SEM-EDS elemental maps of sections through the thickness of both samples showing the microstructure of the sections and the distribution of Cr through the sections. The right side of FIG. 5 is a graph of Q-Fog life (time in hours to 5% surface red rust) for the samples. Both samples were produced on the Hot Dip Process Simulator. Both samples had substantially the same coating thickness and substantially the same intermediate alloy layer thickness. In effect, the only difference between the samples is the 0.1% Cr in one of the samples. It is evident from the graph that the Cr resulted in the HDPS MAZ125+0.1% Cr alloy coating sample having a significantly longer Q-Fog life and therefore significantly better corrosion resistance than the HDPS MAZ125 alloy coating sample. It is also evident from the SEM-EDS maps that there was a higher concentration of Cr in the intermediate alloy layer of the HDPS MAZ125+0.1% Cr alloy coating sample. It follows that the Cr in the intermediate alloy layer of the HDPS MAZ125+0.1% Cr coating sample contributed to the improved corrosion resistance of this sample.

The research and development work included extensive work to establish the contribution of the intermediate alloy layer to the corrosion resistance of Al—Zn—Si—Mg alloy coating either by virtue of the composition of the intermediate alloy layer or by virtue of the crystal structure of the intermediate alloy layer.

This work identified the following composition range of the intermediate alloy layer, by weight, that offers the optimum Al—Zn—Si—Mg alloy coating corrosion performance:

| | |
|---|---|
| Zn | 4.0-12.0%, |
| Si | 6.0-17.0%, |
| Fe | 20.0-40.0%, |
| Mg | 0.02-0.50%, |
| Balance | Al and unavoidable impurities. |

The corrosion performance of the Al—Zn—Si—Mg alloy coating is inferior outside the above composition range of the intermediate alloy layer of the coating.

The above composition range of the intermediate alloy layer was determined by extensive testing (including but not limited to, coating corrosion through Q-Fog test and outdoor exposure, coating ductility through T bend tests etc) of Al—Zn—Si—Mg alloy coatings on steel samples with molten alloy bath compositions across the ranges of AZ+0-5.0% Si, 0-5.0% Mg, 0-0.1% Cr, 0-0.4% Mn, 0-0.1% V, and 0-0.1% Ca at strip immersion times of 0.3-20 seconds and pot temperatures of 595-640° C. to identify samples that delivered desirable performances. A wide range of analytical techniques were employed to (a) study the chemical compositions, thicknesses and crystal structures of the intermediate alloy layers and (b) develop an understanding of critical properties of the intermediate alloy layer that contribute to the performances of the final coated product. FIGS. 2-9 are a sample of the results of this research and development work.

The research and development work also found that the above composition range of the intermediate alloy layer is not an inevitable outcome of the selection of the molten Al—Zn—Si—Mg alloy bath composition and that factors such as but not limited to molten Al—Zn—Si—Mg alloy composition and hot dip process conditions, typically strip immersion time and coating pot temperature, are relevant factors to forming an intermediate alloy layer having a required composition. In particular, although it may not necessarily be obvious to a person skilled in the art, the chemical compositions, thicknesses and crystal structures of the intermediate alloy layers illustrated in the Figures are interrelated and contribute to the performance of the coated strip as a whole.

Figure 6:
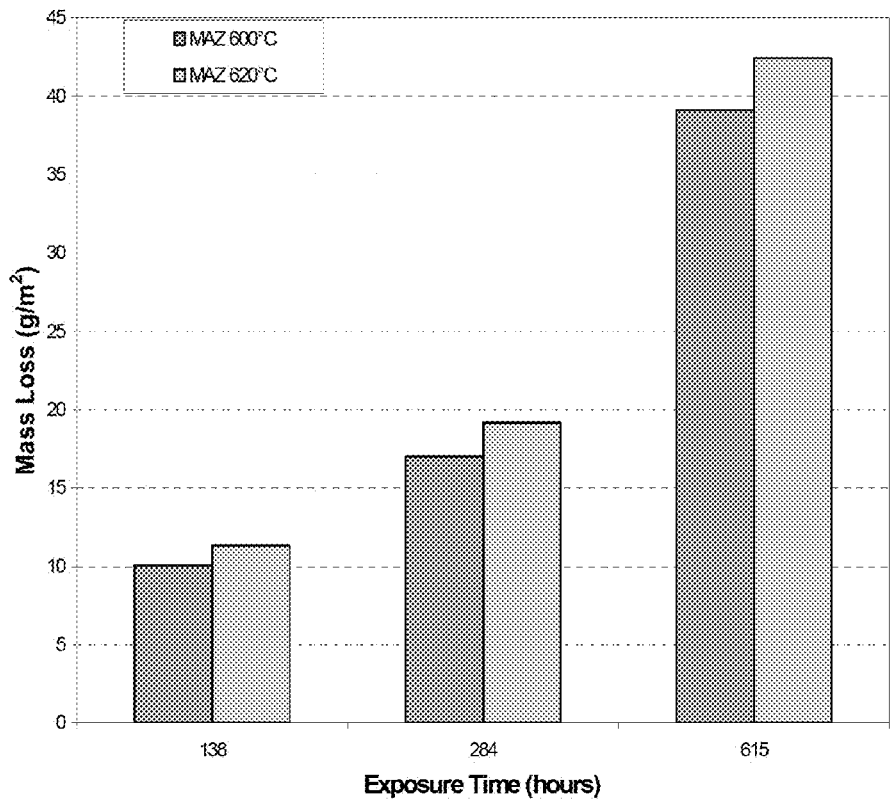
FIG. 6 is a graph showing the effect of pot temperature on the compositions of the intermediate alloy layers and, in turn, on the Q-Fog mass losses of samples coated with the same Al—Zn—Si—Mg alloy.

FIG. 6 is a graph showing the effect of coating pot temperature on the compositions of the intermediate alloy layers and, in turn, on the Q-Fog mass losses, of two Al—Zn—Si—Mg alloy coatings. Samples were prepared at two different pot temperatures, 600° C. and 620° C. respectively, using the same molten Al—Zn—Si—Mg alloy in the coating bath and the same immersion time (1 second). The coated samples were analysed to determine the compositions of the intermediate alloy layers. The intermediate alloy compositions are set out in the table below the bar graph in FIG. 6. The thicknesses of the intermediate alloy layers are also presented in the table. The samples were subjected to the same Q-Fog corrosion test procedure. FIG. 6 shows that the 610° C. and 620° C. pot temperatures produced different intermediate alloy layer compositions. At 620° C. pot temperature the intermediate alloy layer composition was outside the invention composition range (Si<6% in particular). As a result, the corrosion performance of the Al—Zn—Si—Mg alloy coating suffers, despite a greater intermediate alloy layer thickness, which would otherwise have been advantageous if the composition of the intermediate alloy layer was the same as that at 600° C. pot temperature (or within the invention range). The compositions of the intermediate alloy layers were analysed using an inductively-coupled plasma spectrometry (ICP) technique. In accordance with this technique, firstly the Al—Zn—Si—Mg alloy coating overlay was removed by submerging the sample in a 1:9 aqueous HCl solution inhibited by sodium arsenite (9 g per liter). The intermediate alloy layer was then dissolved using a RODINE® inhibited HCl solution and the resultant solution was analysed by ICP.

Figure 7:
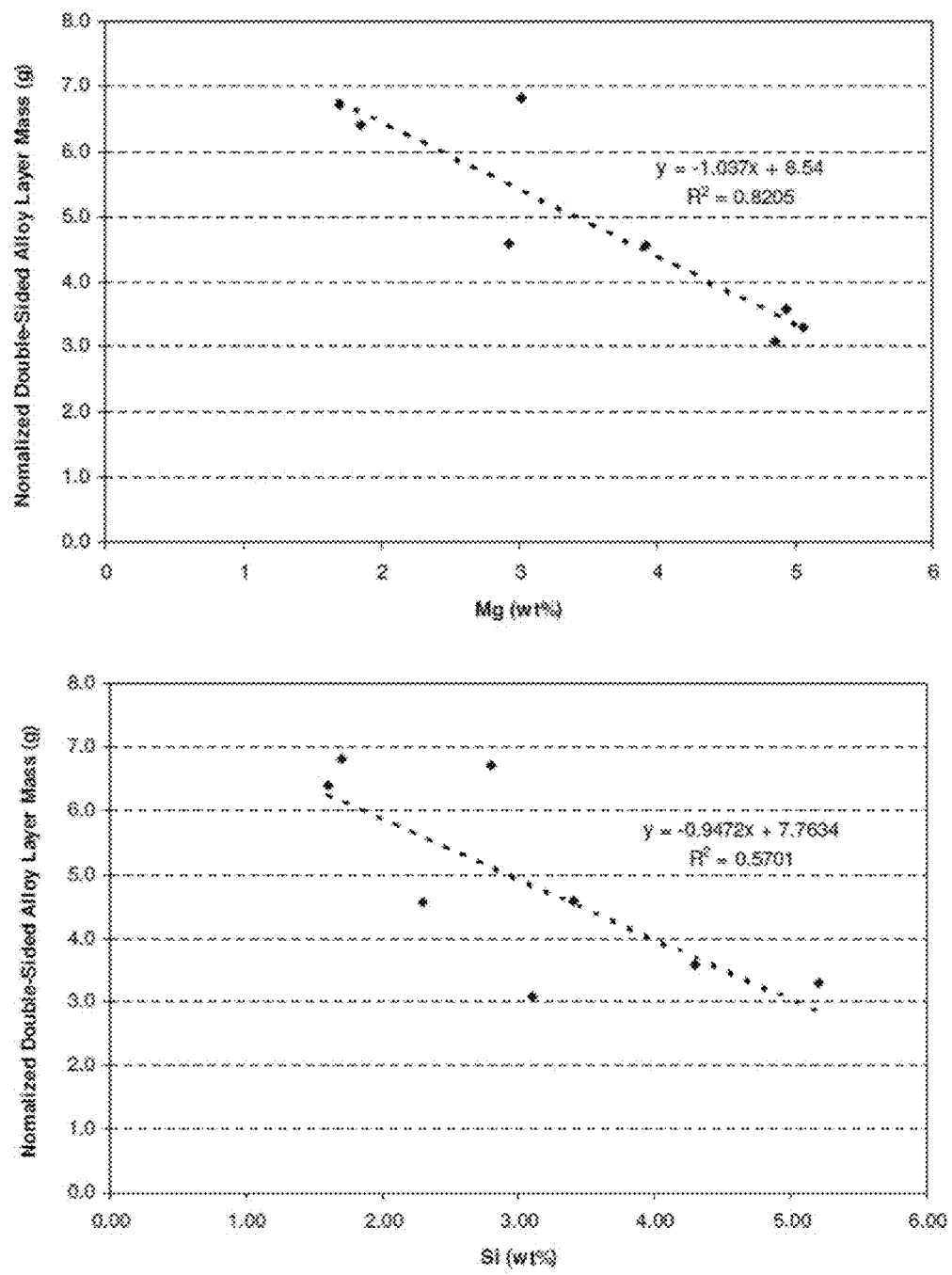
FIG. 7 is a graph of experimental results showing the effect of Mg and Si in coating bath compositions of Al—Zn—Si—Mg alloys on the mass of intermediate alloy layers of samples of metallic coated strip in accordance with the invention.

FIG. 7 is a graph of the mass of intermediate alloy layers of samples of metallic coated steel strip obtained under the same hot dip process conditions (1 second immersion time at 600° C. pot temperature) in accordance with the invention versus concentrations of Mg and Si in coating baths of an Al—Zn—Si—Mg alloy used to form the coatings on the samples. FIG. 7 shows that the mass of the intermediate alloy layer decreased with increasing Mg and Si concentrations in coating baths.

Figure 8:
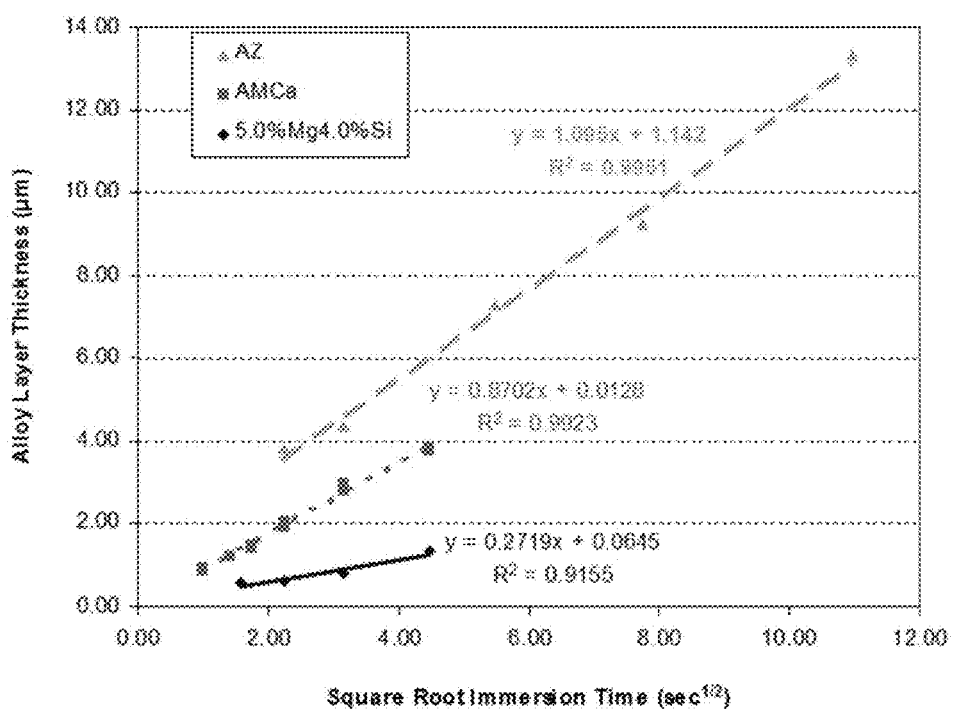
FIG. 8 is a graph of the thicknesses of intermediate alloy layers of samples of metallic coated strip in accordance with the invention and other metallic coated steel strip versus immersion time in coating baths used to form the coatings on the samples.

FIG. 8 is a graph of the thicknesses of intermediate alloy layers of samples of metal coated strip in accordance with the invention versus immersion time in coating baths of coating alloys used to form the coatings on the samples. FIG. 8 presents the results of work on 3 different molten alloy bath compositions. One molten alloy is a known Al—Zn—Si alloy (the "AZ" alloy in the Figure). Another molten alloy is an Al—Zn—Si—Mg alloy that also includes Ca in accordance with the invention (the "AMCa alloy in the Figure"). The 3$^{rd}$ molten alloy is a known Al—Zn—Si—Mg alloy having 5.0% Mg and 4.0% Si (the "5.0% Mg4.0% Si" alloy in the Figure). FIG. 8 shows that the molten alloy bath composition and the immersion time in the molten alloy bath have an impact on the thickness of the intermediate alloy layer of coated steel strip.

Figure 9:
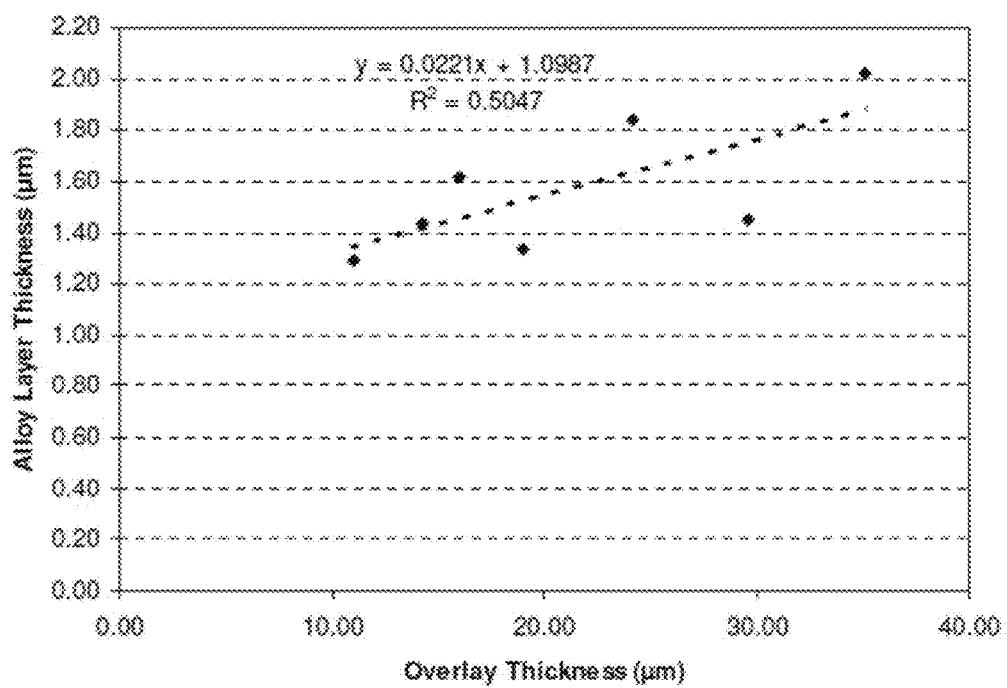
FIG. 9 is a graph of the thicknesses of intermediate alloy layers of samples of metallic coated strip in accordance with the invention versus thicknesses of the overlay alloy layers on the samples.

FIG. 9 is a graph of the thicknesses of intermediate alloy layers of coatings of metallic coated strip samples in accordance with the invention versus the thicknesses of the overlay alloy layers of the coatings on the samples. FIG. 9 shows that the intermediate alloy layer thickness increased with the overlay alloy layer thickness. It follows from FIG. 9 that it is therefore desirable to minimize any coating mass variation across the surface of the entire coated strip to maintain uniform corrosion performance.

Apart from the direct contribution of the intermediate alloy layer to the corrosion performance of the Al—Zn—Si—Mg alloy coating by virtue of the composition and/or thickness of the intermediate alloy layer, the applicant has also found that the crystal structure of the intermediate alloy layer can have an indirect impact on the corrosion performance of the overall MAZ alloy coating by way of cracking. The applicant has found that the intermediate alloy layer is one significant source of crack initiation when the Al—Zn—Mg—Si alloy coated strip is subjected to high strain operations such as roll forming. Coarse intermediate alloy layer crystal structures result in wider and more numerous cracks penetrating through the overlay alloy layer of the coating and the corrosion performance of the Al—Zn—Mg—Si alloy coated strip will suffer. Although the intermediate alloy layer can include equiaxial, columnar or a mixture of equiaxial and columnar crystals, to minimise cracking, it is desirable to control the size of columnar crystals to be no more than 1000 nm in a short diameter as measured on a cross section through the thickness of the coating, and/or the size of equiaxial crystals to be no more than 4000 nm in a long diameter as measured on a cross section through the thickness of the coating.

Although, from the corrosion performance point of view, it is desirable to have the presence of a substantial intermediate alloy layer (or no thinner than 0.1 μm), it is disadvantageous if the intermediate alloy layer is too thick (or thicker than 5 μm), as this induce cracking and impair the roll formability of the coated strip.

Many modifications may be made to the present invention described above without departing from the spirit and scope of the invention.

By way of example, whilst the research and development work described above in relation to FIGS. 2-9 focused on coatings formed from coating baths of particular Al—Zn—Si—Mg alloys, the present invention is not confined to these particular alloys.

The invention claimed is:

1. A metallic coated steel strip that includes a steel strip and a metallic coating on at least one side of the strip, with the metallic coating including an Al—Zn—Mg—Si overlay alloy layer and an intermediate alloy layer between the steel strip and the overlay alloy layer, wherein the intermediate alloy layer has a composition of, by weight, 4.0-12.0% Zn, 6.0-17.0% Si, 20.0-40.0% Fe, 0.02-0.50% Mg, and balance Al and unavoidable impurities, and wherein the intermediate alloy layer includes substantially columnar crystals measuring 50-1000 nm in a short diameter as measured on a cross section through the thickness of the coating.

2. The metallic coated steel strip defined in claim 1 wherein the intermediate alloy layer includes, by weight, 0.01-0.2% Ca.

3. The metallic coated steel strip defined in claim 1 wherein the intermediate alloy layer includes, by weight, 0.1-3.0% Cr.

4. The metallic coated steel strip defined in claim 1 wherein the intermediate alloy layer includes, by weight, 0.1-13.0% Mn.

5. The metallic coated steel strip defined in claim 1 wherein the intermediate alloy layer includes, by weight, 0.1-2.0% V.

6. The metallic coated steel strip defined in claim 1 wherein the intermediate alloy layer has a thickness of 0.1-5.0 μm as measured on a cross-section through the thickness of the coating.

7. The metallic coated steel strip defined in claim 1 wherein the intermediate alloy layer includes a mixture of columnar crystals and equiaxial crystals.

8. The metallic coated steel strip defined in claim 1 wherein the intermediate alloy layer includes body centered cubic crystals.

9. The metallic coated steel strip defined in claim 1 wherein Al, Zn, Si and Fe concentrations of the intermediate alloy layer satisfy the formula $Fe_{10}Al_{32}Si_5Zn_3$.

10. The metallic coated steel strip defined in claim 1 wherein Al, Zn, Si and Fe concentrations of the intermediate alloy layer satisfy the formula $Fe_{10}Al_{34}Si_4Zn_2$.

11. A method of forming a metallic coating on a steel strip including dipping steel strip into a bath of a molten Al—Zn—Si—Mg alloy and forming the metallic coated steel strip defined in claim 1.

12. The methods defined in claim 11 wherein the molten Al—Zn—Si—Mg alloy for forming the metallic coating includes more than 0.3% by weight Mg.

13. The methods defined in claim 11 wherein the molten Al—Zn—Si—Mg alloy for forming the metallic coating includes more than 1.3% by weight Mg.

14. The methods defined in claim 11 wherein the molten Al—Zn—Si—Mg alloy for forming the metallic coating includes less than 3% by weight Mg.

15. The methods defined in claim 11 wherein the molten Al—Zn—Si—Mg alloy for forming the metallic coating includes less than 2.5% by weight Mg.

16. The methods defined in claim 11 wherein the molten Al—Zn—Si—Mg alloy for forming the metallic coating includes more than 1.2% by weight Si.

17. The methods defined in claim 11 wherein the molten Al—Zn—Si—Mg alloy for forming the metallic coating includes the following ranges in % by weight of the elements Al, Zn, Si, and Mg:

| | |
|---|---|
| Zn: | 30 to 60% |
| Si: | 0.3 to 3% |
| Mg: | 0.3 to 10% |
| balance | Al and unavoidable impurities. |

18. The methods defined in claim 11 wherein the molten Al—Zn—Si—Mg alloy for forming the metallic coating includes the following ranges in % by weight of the elements Al, Zn, Si, and Mg:

| | |
|---|---|
| Zn: | 35 to 50% |
| Si: | 1.2 to 2.5% |
| Mg | 1.0 to 3.0% |
| balance | Al and unavoidable impurities. |

19. A metallic coated steel strip that includes a steel strip and a metallic coating on at least one side of the strip, with the metallic coating including an Al—Zn—Mg—Si overlay alloy layer and an intermediate alloy layer between the steel strip and the overlay alloy layer, wherein the intermediate alloy layer has a composition of, by weight, 4.0-12.0% Zn, 6.0-17.0% Si, 20.0-40.0% Fe, 0.02-0.50% Mg, and balance Al and unavoidable impurities, and wherein the intermediate alloy layer includes substantially equiaxial crystals measuring 50-4000 nm in a long diameter as measured on a cross section through the thickness of the coating.

20. The metallic coated steel strip defined in claim 19 wherein the intermediate alloy layer includes, by weight, 0.01-0.2% Ca.

21. The metallic coated steel strip defined in claim 19 wherein the intermediate alloy layer includes, by weight, 0.1-3.0% Cr.

22. The metallic coated steel strip defined in claim 19 wherein the intermediate alloy layer includes, by weight, 0.1-13.0% Mn.

23. The metallic coated steel strip defined in claim 19 wherein the intermediate alloy layer includes, by weight, 0.1-2.0% V.

24. The metallic coated steel strip defined in claim 19 wherein the intermediate alloy layer has a thickness of 0.1-5.0 μm as measured on a cross-section through the thickness of the coating.

25. The metallic coated steel strip defined in claim 19 wherein the intermediate alloy layer includes a mixture of columnar crystals and equiaxial crystals.

26. The metallic coated steel strip defined in claim 19 wherein the intermediate alloy layer includes body centered cubic crystals.

27. The metallic coated steel strip defined in claim 19 wherein Al, Zn, Si and Fe of the intermediate alloy layer satisfy the formula $Fe_{10}Al_{32}Si_5Zn_3$.

28. The metallic coated steel strip defined in claim 19 wherein Al, Zn, Si and Fe of the intermediate alloy layer satisfy the formula $Fe_{10}Al_{34}Si_4Zn_2$.

29. A method of forming a metallic coating on a steel strip including dipping steel strip into a bath of a molten Al—Zn—Si—Mg alloy and forming the metallic coated steel strip defined in claim 19.

* * * * *